US011054248B2

(12) United States Patent
Amourak et al.

(10) Patent No.: US 11,054,248 B2
(45) Date of Patent: Jul. 6, 2021

(54) METHOD FOR DETERMINING DEFORMATION, AND ASSOCIATED EQUIPMENT COMPRISING A PLURALITY OF CORRESPONDING WAVELENGTH COUPLES EACH INCLUDING A DETERMINED WAVELENGTH AND A CORRESPONDING BRAGG WAVELENGTH

(71) Applicant: ArcelorMittal, Luxembourg (LU)

(72) Inventors: Mounir Amourak, Metz (FR); Thiago Rabelo Nunes Campos, Vigy (FR); Herve Pierret, Amneville (FR); Pierre-Jean Krauth, Mondelange (FR); Dominique Sert, Montoy-Flanville (FR); Joseph Iezzi, Yutz (FR); Michel Nogues, Arssur Moselle (FR)

(73) Assignee: ArcelorMittal, Luxembourg (LU)

( * ) Notice: Subject to any disclaimer, the term of this patent is extended or adjusted under 35 U.S.C. 154(b) by 73 days.

(21) Appl. No.: 16/612,688

(22) PCT Filed: May 31, 2018

(86) PCT No.: PCT/IB2018/000585
§ 371 (c)(1),
(2) Date: Nov. 11, 2019

(87) PCT Pub. No.: WO2018/220436
PCT Pub. Date: Dec. 6, 2018

(65) Prior Publication Data
US 2020/0064123 A1 Feb. 27, 2020

(30) Foreign Application Priority Data

Jun. 2, 2017 (WO) .................. PCT/IB2017/000682

(51) Int. Cl.
G01K 11/32 (2021.01)
G01B 11/16 (2006.01)
G01K 11/3206 (2021.01)

(52) U.S. Cl.
CPC .......... *G01B 11/18* (2013.01); *G01K 11/3206* (2013.01)

(58) Field of Classification Search
CPC ..... G01B 11/18; G01K 11/3206; G01L 1/246; G01M 11/085
USPC ........................... 250/227.14, 227.11, 227.18
See application file for complete search history.

(56) References Cited

U.S. PATENT DOCUMENTS 10,634,486 B2 * 4/2020 Casari ................ G01M 5/0091
2009/0285521 A1 11/2009 Kunigami et al.
2011/0144790 A1 6/2011 Gerritsen et al.

FOREIGN PATENT DOCUMENTS

DE 102008059856 A1 6/2010

OTHER PUBLICATIONS

ISR of PCT/IB2018/000585, dated Aug. 16, 2018.

* cited by examiner

Primary Examiner — Que Tan Le
(74) Attorney, Agent, or Firm — Davidson, Davidson & Kappel, LLC

(57) ABSTRACT

A method of determination of deformation along a first direction of an equipment (1) in contact with hot material and including an inner face (3) in contact with the hot material and an outer face (4) opposite to the inner face (3) is provided. An equipment (1) in contact with hot material provided with means to determine its deformation along a first direction is also provided.

20 Claims, 4 Drawing Sheets

METHOD FOR DETERMINING DEFORMATION, AND ASSOCIATED EQUIPMENT COMPRISING A PLURALITY OF CORRESPONDING WAVELENGTH COUPLES EACH INCLUDING A DETERMINED WAVELENGTH AND A CORRESPONDING BRAGG WAVELENGTH

The invention relates to a method for determining deformation of an equipment in contact with hot material and to the associated equipment.

BACKGROUND

As known by the man skilled in the art, some equipment comprises an inner (or hot) face in contact with hot material and an outer (or cold) face opposite to this inner face. This is notably the case of a blast furnace that generally comprises an inner wall partly covered with equipment defining cooling plates (or staves). In the rest of the text, the term cooling plates or staves will be used interchangeably.

For instance, in the case of a cooling plate the inner face may comprise ribs, parallel therebetween, and grooves, also parallel therebetween and each separating two neighboring ribs, that allow anchorage of a refractory brick guniting or lining or of an accretion layer inside the blast furnace. The cooling plate is also equipped with cooling tubes spreading all along the outer face of the stave to keep it cooled while in operation.

This stave body undergoes deformations due to differential dilatation linked to the fixation of the stave to the blast furnace wall and to the thermal constraints the stave is subjected to. These deformations, which increase with time, mainly results in a curvature (or bending) in a vertical cross section that is often called "banana effect". The magnitude of this curvature may vary from place to place in the same stave body.

The stave deformations may induce a protrusion of a part of the stave into the furnace which will be preferentially hit by materials charged into the furnace. It will induce a premature wear of the stave and may lead to a breakage in the furnace wall which would no longer be protected. So, it would be useful to monitor the deformations of a stave in order to replace it when the magnitude of its deformations reaches a predefined threshold.

But, it is very difficult to perform such a monitoring due to the very constraining environment and also due to the lack of available space on or in the stave, and more generally in an equipment subjected to hot conditions on its inner face.

Document DE 10 2008 059856 describes a pressure sensor for determining pressure distributions in a surface with high reliability and accuracy. This sensor comprises at least one optical fibre comprising several fibre gratings, these gratings being deformed according to the pressure exerted on the surface where they are located. This sensor does not allow to determine and monitoring the deformation of the equipment.

Document US 2011/0144790 describes systems and methods for monitoring thermal conditions in material processing assemblies, such as elevated temperature reactors. Optical fibers are positioned in conduits formed or installed in walls of the furnace and are used as thermal sensors. This system and method does not allow to determine and monitoring the deformation of the equipment.

Document US2009/285521 describes an optical fiber sensor for detecting stresses with an optical fiber which incorporates therein a plurality of gratings for reflecting light beams having certain wavelengths. This sensor does not allow to determine and monitoring the deformation of the equipment.

SUMMARY OF THE INVENTION

It is an object of the present invention to allow determination and monitoring of equipment deformations.

The present invention provides a method of monitoring of deformation along a first direction of an equipment in contact with hot material and comprising an inner face in contact with this hot material and an outer face opposite to this inner face.

This method comprises the steps of:
providing the equipment outer face with:
  at least one first optical fibre set along the first direction and comprising at least two first Bragg gratings having different grating periods for reflecting photons having different Bragg wavelengths, and
  at least two second optical fibers set along at least one second direction that crosses a first optical fibre at a crossing point located in the vicinity of one of the first Bragg gratings, and each comprising, in the vicinity of a crossing point, a second Bragg grating having a grating period for reflecting photons having a Bragg wavelength,
inputting photons having wavelengths belonging to a wavelength group comprising all of these Bragg wavelengths, into respective first ends of the first and second optical fibers,
determining wavelengths of photons reflected by a corresponding first or second Bragg grating, and
determining a deformation of the equipment along the first direction from corresponding couples each comprising a determined wavelength and a corresponding Bragg wavelength.

The method of the invention may also comprise the following optional characteristics considered separately or according to all possible technical combinations:
the step of providing may comprise providing:
  two first optical fibers set along parallel first directions and comprising at least three first Bragg gratings having different grating periods for reflecting photons having different Bragg wavelengths, and
  three second optical fibers set along second directions that each cross these two first optical fibers at crossing points located in the vicinity of three of the first Bragg gratings, and each comprising at least two second Bragg gratings having different grating periods for reflecting photons having different Bragg wavelengths and located in the vicinity of corresponding crossing points;
in a first alternative, the step of determining a deformation may comprise the subsequent sub steps of:
  determining a strain variation experienced by each first Bragg grating, considering there is no temperature variation, from a corresponding couple comprising a determined wavelength of photons reflected by this first Bragg grating and the Bragg wavelength of this first Bragg grating and from a strain reference,
  determining a temperature variation into each second Bragg grating from a corresponding couple comprising a determined wavelength of photons reflected by this second Bragg grating and the Bragg wavelength of this second Bragg grating,
  correcting the determined strain variation of each first Bragg grating according to the determined temperature variation of at least a second Bragg grating located into the vicinity of this first Bragg grating, and determining a deformation of the equipment along the first direction from the corresponding corrected strain variations of the at least first optical fibre;

in a second alternative, the step of determining a deformation may comprise the subsequent sub steps of:

determining a temperature variation into each second Bragg grating from a corresponding couple comprising a determined wavelength of photons reflected by the second Bragg grating and the Bragg wavelength of the second Bragg grating, determining a corrected strain into each first Bragg grating using the previously determined temperature variation, determining a corrected strain variation experienced by each first Bragg grating from the previously determined corrected strain and from a strain reference, and determining a deformation of the equipment along the first direction from the corresponding corrected strain variations of the at least first optical fibre.

The invention also provides an equipment intended for being in contact with hot material and comprising an inner face in contact with this hot material and an outer face opposite to this inner face.

This equipment is characterized in that its outer face comprises:

at least one first optical fibre set along a first direction and comprising at least two first Bragg gratings having different grating periods for reflecting photons having different Bragg wavelengths, at least two second optical fibers set along at least one second direction that crosses this first optical fibre at a crossing point located in the vicinity of one of the first Bragg gratings, and each comprising, in the vicinity of a crossing point, a second Bragg grating having a grating period for reflecting photons having a Bragg wavelength, photon sources arranged for inputting photons, having wavelengths belonging to a wavelength group comprising all of these Bragg wavelengths, into respective first ends of these first and second optical fibers, sensors coupled respectively to these first ends and arranged for determining wavelengths of photons reflected by a corresponding first or second Bragg grating, and processing means arranged for determining a deformation of the equipment along the first direction from corresponding couples each comprising a determined wavelength and a corresponding Bragg wavelength.

The equipment of the invention may also comprise the following optional characteristics considered separately or according to all possible technical combinations:

it may comprise two first optical fibers set along parallel first directions and comprising at least three first Bragg gratings having different grating periods for reflecting photons having different Bragg wavelengths, and three second optical fibers set along second directions that each cross these two first optical fibers at crossing points located in the vicinity of three of the first Bragg gratings, and each comprising at least two second Bragg gratings having different grating periods for reflecting photons having different Bragg wavelengths and located in the vicinity of corresponding crossing points;

in a first embodiment, the processing means may be arranged for determining a strain variation experienced by each first Bragg grating from a corresponding couple comprising a determined wavelength of photons reflected by this first Bragg grating and the Bragg wavelength of this first Bragg grating, and a temperature variation into each second Bragg grating from a corresponding couple comprising a determined wavelength of photons reflected by this second Bragg grating and the Bragg wavelength of this second Bragg grating, then for correcting the determined strain variation of each first Bragg grating as according to the determined temperature variation of at least a second Bragg grating located into the vicinity of this first Bragg grating, then for determining a deformation of the equipment along each first direction of a first optical fibre from the corresponding corrected strain variations of this first optical fibre;

each second optical fibre may be installed in a thermal-conducting tube that is set along one of the second directions;

each thermal-conducting tube may be installed fixedly in a horizontal groove defined into the outer face along one of the second directions;

each thermal-conducting tube may be installed fixedly in a horizontal groove by means of a glue;

each thermal-conducting tube may comprise an exterior-facing part covered with a copper paste;

the copper paste may comprise an exterior-facing part covered with a copper cover;

all the second directions may be parallel therebetween;

each first optical fibre may be installed fixedly in a vertical groove defined into the outer face along a first direction;

each first optical fibre may be installed fixedly in a vertical groove by means of a glue;

each first optical fibre may comprise an exterior-facing part covered with a seal material;

the seal material may comprise an exterior-facing part covered with a protection material intended for protecting it against heat shocks;

it may define a cooling plate of a blast furnace;

the first direction may be a vertical direction of the cooling plate and the second direction may be an horizontal direction of the cooling plate.

BRIEF DESCRIPTION OF THE DRAWINGS

The invention also relates to a blast furnace comprising at least one equipment such as the one above introduced.

Other characteristics and advantages of the invention will emerge clearly from the description of it that is given below by way of an indication and which is in no way restrictive, with reference to the appended figures in which.

1 in an area comprising a horizontal groove which comprises a thermal-conducting tube comprising a second optical fibre.

DETAILED DESCRIPTION

The invention aims, notably, at proposing a method for determining deformation of an equipment 1 that can be used in a system or apparatus or installation and comprising determination means intended for determining its deformation along a first direction D1.

In the following description it will be considered as an example that the equipment 1 is a cooling plate that can be used in a blast furnace and which comprises monitoring means intended for monitoring its deformation along a first direction D1. But the equipment 1 may be also a continuous casting roller or a galvanization snout for instance.

Figure 1:
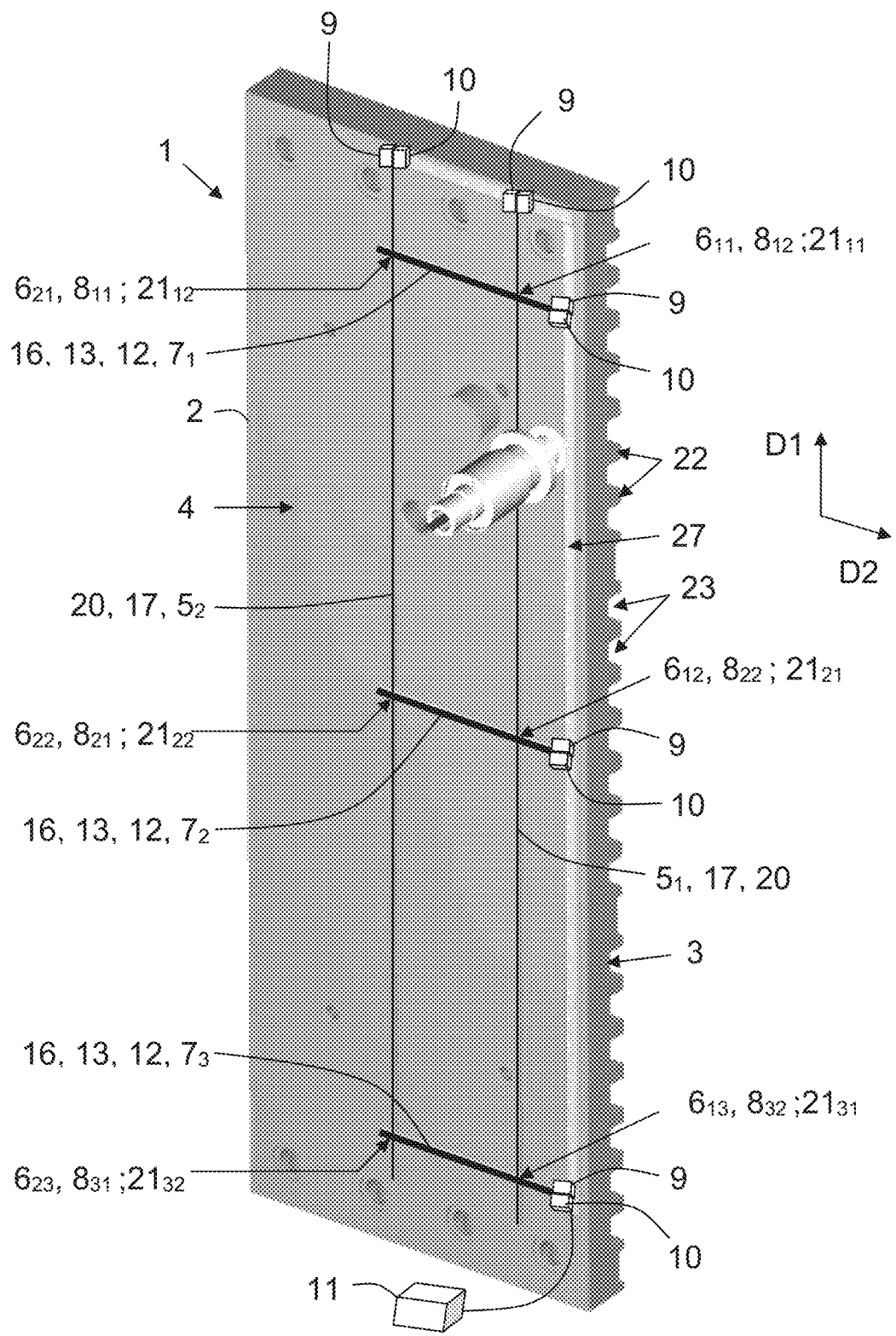
FIG. 1 illustrates schematically, in a perspective view, an example of embodiment of a cooling plate according to the invention.

An example of embodiment of an equipment 1 (here a cooling plate) according to the invention is illustrated in FIG. 1. Such a cooling plate 1 is intended to be mounted on an inner wall of a blast furnace.

As illustrated, a cooling plate 1 according to the invention comprises a copper body 2 having an inner (or hot) face 3 and an outer (or cold) face 4 opposite to its inner face 3. The body 2 may be made of copper, for instance, or of pig iron.

The inner face comprises several ribs 22 parallel there between and separated by grooves 23. Once the cooling plate 1 is mounted on the blast furnace inner wall, its ribs 22 and grooves 23 are arranged (or set) horizontally.

The outer face 4 is fixed to the blast furnace inner wall. So, the inner face 3 is the body face in contact with the very hot material and gas present inside the blast furnace.

The ribs 22 and grooves 23 may have a dovetail cross-section in order to optimize anchorage of a process generated accretion layer.

The outer face 4 comprises at least one first optical fibre $5_i$, at least two second optical fibers $7_k$, photon sources 9, sensors 10 and processing means 11 which define together determination means.

Figure 2:
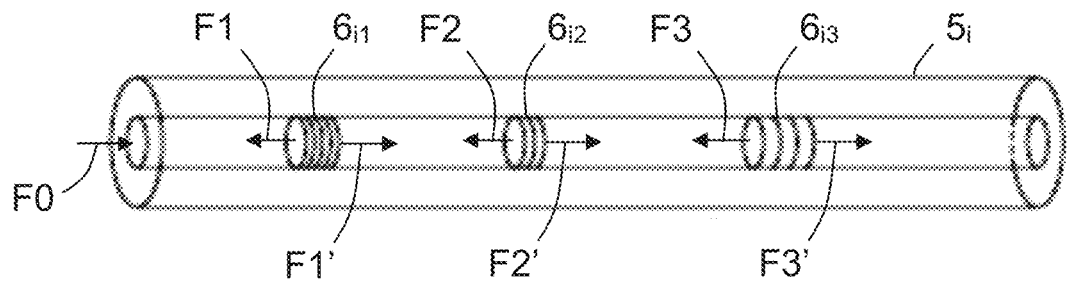
FIG. 2 illustrates schematically, in a perspective view, a part of an example of embodiment of a first optical fibre of the cooling plate illustrated in FIG. 1.

The (each) first optical fibre $5_i$ is set along a first direction D1 (perpendicular to the ribs 22 and grooves 23) and comprises at least two first Bragg gratings having different grating periods for reflecting photons having different Bragg wavelengths A non-limiting example of a part of a first optical fibre $5_i$ comprising three first Bragg gratings $6_{i1}$ to $6_{i3}$ (j=1 to 3) is illustrated in FIG. 2. The first Bragg grating $6_{i1}$ has a first grating period for reflecting photons having a first Bragg wavelength, the second Bragg grating $6_{i2}$ has a second grating period (different from the first one) for reflecting photons having a second Bragg wavelength (different from the first one), and the third Bragg grating $6_{i3}$ has a third grating period (different from the first and second ones) for reflecting photons having a third Bragg wavelength (different from the first and second ones).

It is recalled that an optical fibre Bragg grating is a distributed Bragg reflector constructed in a short portion of an optical fibre and intended for reflecting photons having at least one particular wavelength $\lambda_B$, named Bragg wavelength, while transmitting photons having wavelengths different from each Bragg wavelength $\lambda_B$ it reflects. Such a Bragg grating may be defined, for instance, by creating a periodic variation in the refractive index of the optical fibre core, which generates a wavelength-specific dielectric mirror.

The reflected Bragg wavelength $\lambda_B$ is defined by the following equation:

$$\lambda_B = 2 \cdot n \cdot \Lambda,$$

where n is the effective refractive index of the Bragg grating in the optical fibre core (which depends on the photon wavelength and on the photon propagation mode (in multi-mode waveguides)), and $\Lambda$ is the grating period.

In FIG. 2, the photons, having different wavelengths and that enter the first optical fibre $5_i$ on the left side (arrow F0), propagate into the latter ($5_i$) and when they reach the first Bragg grating $6_{i1}$ those having the first Bragg wavelength are reflected (arrow F1), while those having wavelengths different from the first Bragg wavelength are transmitted (arrow F1') and keep on propagating towards the second Bragg grating $6_{i2}$. When the transmitted photons reach the second Bragg grating $6_{i2}$, those having the second Bragg wavelength are reflected (arrow F2), while those having wavelengths different from the second Bragg wavelength are transmitted (arrow F2') and keep on propagating towards the third Bragg grating $6_{i3}$. When the transmitted photons reach the third Bragg grating $6_{i3}$, those having the third Bragg wavelength are reflected (arrow F3), while those having wavelengths different from the third Bragg wavelength are transmitted (arrow F3') and keep on propagating towards the first optical fibre $5_i$.

It is important to understand that when an optical fibre comprises a Bragg grating and is not "stressed" (by a strain variation or a temperature variation) its Bragg wavelength is predefined. But when this optical fibre is stressed in a portion comprising this Bragg grating, its Bragg wavelength is modified and therefore is no more the predefined one. So, a local stress variation or temperature variation of an optical fibre can be detected by a modification of the Bragg wavelength of the photons reflected by its local Bragg grating.

Each second optical fibre $7_k$ is set along a second direction D2 that crosses each first optical fibre $5_i$ at a crossing point $21_{ki}$ located in the vicinity of one of the first Bragg gratings $6_{ij}$. So, the different second optical fibers $7_k$ are set along at least one second direction D2. More, each second optical fibre $7_k$ comprises, in the vicinity of each crossing point $21_{ki}$, a second Bragg grating $8_{kn}$ (not illustrated but similar to the ones illustrated in FIG. 2) having a grating period for reflecting photons having a Bragg wavelength. So when the determination means comprises only one first optical fibre $5_i$, each second optical fibre $7_k$ comprises at least one second Bragg grating, and when the monitoring means comprises two first optical fibers $5_i$ (i=1 or 2, as illustrated in FIG. 1), each second optical fibre $7_k$ comprises at least two second Bragg gratings.

In the case where the equipment 1 is a cooling plate (or stave), the first direction D1 may be a vertical direction of this cooling plate 1 and the second direction D2 may be an horizontal direction of this cooling plate 1. But the first D1 and second D2 directions of the equipment 1 depend of its arrangement. What is important is that the first direction D1 is a direction along which the equipment 1 is subjected to a deformation due to the hot conditions on its inner face 3. In the non-limiting example illustrated in FIG. 1 all the second directions D2 are parallel therebetween. But in another type of equipment 1 the second directions D2 could be different therebetween.

In the non-limiting example illustrated in FIG. 1, the determination means comprises three second optical fibers $7_1$ to $7_3$ (k=1 to 3) for the determination of the temperature variations with at least two second Bragg gratings $8_{kn}$, and two first optical fibers $5_i$ (i=1 or 2) for the determination of the strain variations, using said temperature variations with at least three first Bragg gratings $6_{ij}$. So, each second optical fibers $7_k$ crosses the two first optical fibers $5_i$ at two crossing points $21_{ki}$ located respectively in the vicinity of two of their (at least) three first Bragg gratings $6_{ij}$, and comprises at least two second Bragg gratings $8_{kn}$ located respectively in the vicinity of these two crossing points $21_{ki}$. There are always a first Bragg grating $6_{ij}$ and a corresponding second Bragg grating $8_{kn}$ located in the vicinity of a crossing point $21_{ki}$.

But in variants of embodiment the determination means could comprise one first optical fibre $5_1$ (with at least two first Bragg gratings $6_{1j}$) and two second optical fibers $7_k$ (k=1 or 2, with at least one second Bragg grating $8_{kn}$), or two first optical fibers $5_i$ (i=1 or 2, with at least two first Bragg gratings $6_{ij}$) and two second optical fibers $7_1$ (k=1 or 2 with at least two second Bragg gratings $8_{kn}$), or else three or more first optical fibers $5_i$ and two or more second optical fibers $7_k$.

The number of second optical fibers $7_k$ is advantageously chosen according to the known areas submitted to substantially different temperatures. In the case of an implementation on the cold face of a stave, it is known that the upper and lower edges are colder than the central portion, so three second optical fibers $7_k$ are therefore adapted.

It is important to notice that a Bragg wavelength $\lambda_B(8_{kn})$ of a second Bragg grating $8_{kn}$ defined into a second optical fibre $7_k$ may be equal to a Bragg wavelength $\lambda_B(6_{ij})$ of a first Bragg grating defined into a first optical fibre $5_i$, because they concern photons propagating into different optical fibers.

The photon sources 9 are arranged for inputting photons, having wavelengths belonging to a wavelength group comprising all of the Bragg wavelengths, into respective first ends of the first $5_i$ and second $7_k$ optical fibers. For instance, a photon source 9 may comprise at least one light-emitting diode (or LED) providing a white light (i.e. with a broad spectrum comprising the different Bragg wavelengths of the first $6_{ij}$ or second Bragg grating(s) $8_{kn}$ defined into the first $5_i$ or second $7_k$ optical fibre it feeds.

In the non-limiting example illustrated in FIG. 1, the photon sources 9 are located respectively near the first ends of the first $5_i$ and second $7_k$ optical fibers. But they could be located away from these first ends and coupled to the latter via waveguides or other optical fibers.

The sensors 10 are coupled respectively to the first ends (of the first $5_i$ and second $7_k$ optical fibers) and arranged for determining wavelengths of photons reflected by a corresponding first $6_{ij}$ or second Bragg grating $8_{kn}$. As explained above, when a Bragg grating is not stressed, the determined wavelength of the photons reflected by this Bragg grating is equal to the Bragg wavelength of the latter.

For instance, each sensor 10 may be a compact spectrometer.

In the non-limiting example illustrated in FIG. 1, the sensors 10 are located respectively near the first ends of the first $5_i$ and second $7_k$ optical fibers. But they could be located away from these first ends and coupled to the latter via waveguides or other optical fibers.

Also in the non-limiting example illustrated in FIG. 1, the cooling plate 1 comprises a protected groove 27 which may comprise, for instance, cables for electrically feeding and/or controlling the photon sources 9 and sensors 10. In this case, these cables may extend up to a pipe 24 where they may be grouped together, for instance into a sheath intended for protecting them against heat and mechanical stress.

Figure 5:
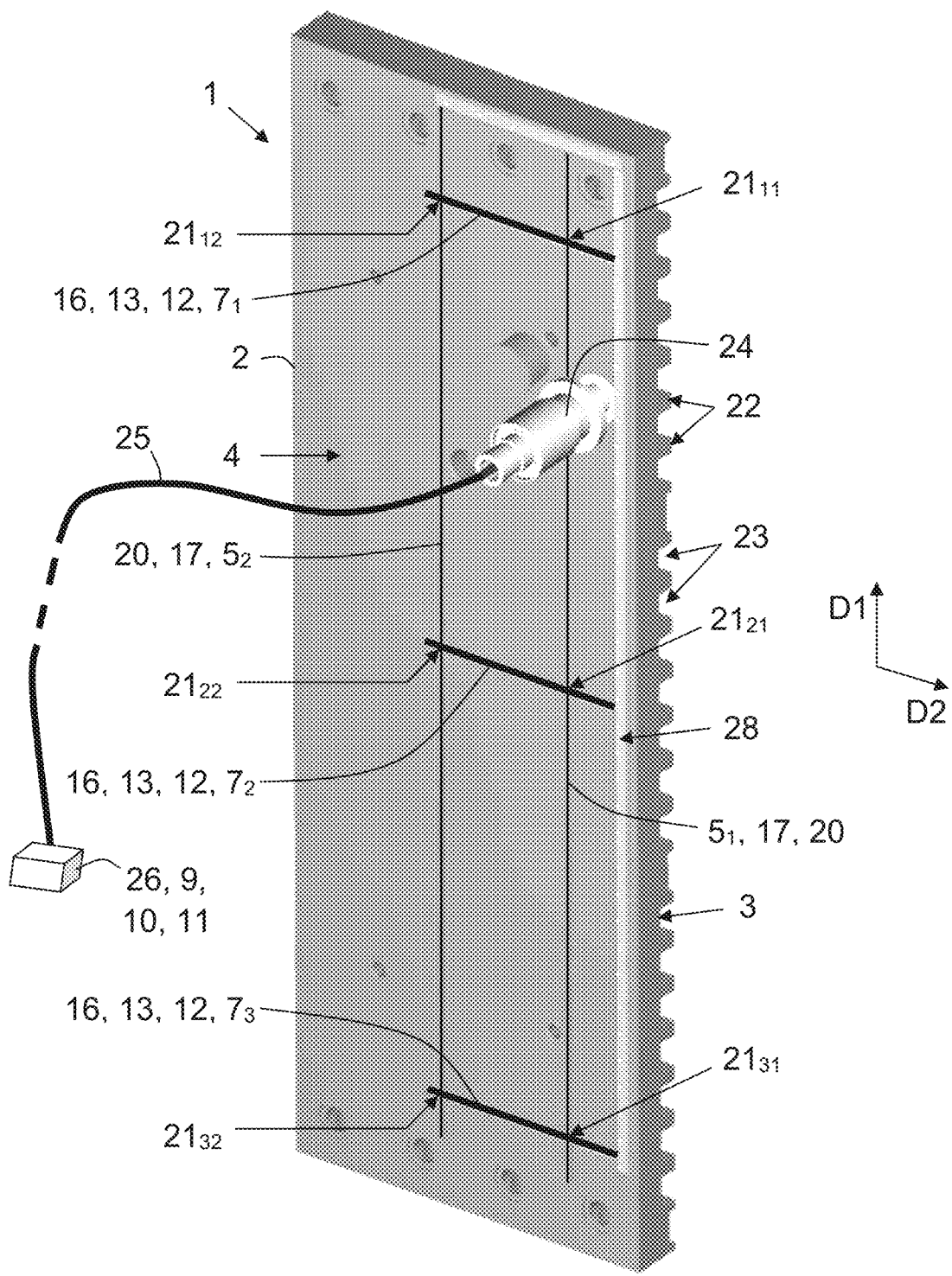
FIG. 5 illustrates schematically, in a perspective view, another example of embodiment of a cooling plate according to the invention.

In a variant of embodiment illustrated in FIG. 5, the first ends of the first $5_i$ and second $7_k$ optical fibers are located away from the cooling plate 1. In fact, the first $5_i$ and second $7_k$ optical fibers goes into a protected groove 28 and extend up to a pipe 24 where they are grouped together into a sheath 25 intended for protecting them against heat and mechanical stress, till they reach a distant box 26 where their respective first ends are connected to the corresponding photon sources 9 and sensors 10.

The processing means 11 is arranged for determining a deformation of the cooling plate 1 along a first direction D1 from corresponding couples each comprising a determined wavelength $\lambda_R$ and a corresponding Bragg wavelength $\lambda_B$. So, the processing means 11 receives the wavelengths detected by the different sensors 10 and determines a cooling plate deformation along the first direction D1 from wavelengths. For instance, if one considers the first direction D1 of the first first optical fibre $5_1$ of the example of FIG. 1, then the corresponding wavelength couples are:

(the determined wavelength $\lambda_R(6_{11})$ of photons reflected by the first first Bragg grating $6_{11}$ of the first first optical fibre $5_1$ in the vicinity of the first crossing point $21_{11}$, and the Bragg wavelength $\lambda_B(6_{11})$ of this first first Bragg grating $6_{11}$), (the determined wavelength $\lambda_R(8_{11})$ of photons reflected by the first second Bragg grating of the first second optical fibre $7_1$ in the vicinity of the first crossing point $21_{11}$, and the Bragg wavelength $\lambda_B(8_{11})$ of this first second Bragg grating $8_{11}$), (the determined wavelength $\lambda_R(6_{12})$ of photons reflected by the second first Bragg grating $6_{12}$ of the first first optical fibre $5_1$ in the vicinity of the third crossing point $21_{21}$, and the Bragg wavelength $\lambda_B(6_{12})$ of this second first Bragg grating $6_{12}$), (the determined wavelength $\lambda_R(8_{21})$ of photons reflected by the first second Bragg grating $8_{21}$ of the second second optical fibre $7_2$ in the vicinity of the third crossing point $21_{21}$, and the Bragg wavelength $\lambda_B(8_{21})$ of this first second Bragg grating), (the determined wavelength $\lambda_R(6_{13})$ of photons reflected by the third first Bragg grating $6_{13}$ of the first first optical fibre $5_1$ in the vicinity of the fifth crossing point $21_{31}$, and the Bragg wavelength $\lambda_B(6_{13})$ of this third first Bragg grating $6_{13}$), and (the determined wavelength $\lambda_R(8_{31})$ of photons reflected by the first second Bragg grating $8_{31}$ of the third second optical fibre $7_3$ in the vicinity of the fifth crossing point $21_{31}$, and the Bragg wavelength $\lambda_B(8_{31})$ of this first second Bragg grating).

The determination of a cooling plate deformation along the first direction D1 from corresponding wavelength couples can be performed by the processing means 11 according to at least two different manners.

In general terms, the processing means 11 may be arranged for determining:

strain $\sigma(6_{ij})$ and strain variation $\Delta\sigma(6_{ij})$ experienced by each first Bragg grating $6_{ij}$ from a corresponding couple $(\lambda_R(6_{ij}), \lambda_B(6_{ij}))$ comprising a determined wavelength $\lambda_R(6_{ij})$ of photons reflected by this first Bragg grating $6_{ij}$ and the Bragg wavelength $\lambda_B(6_{ij})$ of this first Bragg grating $6_{ij}$, and a temperature $T(8_{kn})$ and temperature variation $\Delta T(8_{kn})$ into each second Bragg grating $8_{kn}$ from a corresponding couple $(\lambda_R(8_{kn}), \lambda_B(8_{kn}))$ comprising a determined wavelength $\lambda_R(\mathbf{8}_{kn})$ of photons reflected by this second Bragg grating $\mathbf{8}_{kn}$ and the Bragg wavelength $\lambda_B(\mathbf{8}_{kn})$ of this second Bragg grating $\mathbf{8}_{kn}$.

Then, the processing means 11 are arranged for correcting the determined strain variation $\Delta\sigma(\mathbf{6}_{ij})$ or the strain $\sigma(\mathbf{6}_{ij})$ of each first Bragg grating $\mathbf{6}_{ij}$ according to the determined temperature variation $\Delta T(\mathbf{8}_{kn})$ of at least a second Bragg grating $\mathbf{8}_{kn}$ located into the vicinity of this first Bragg grating $\mathbf{6}_{ij}$. Then, the processing means 11 is arranged for determining a deformation of the cooling plate 1 along first direction D1 of a first optical fibre $\mathbf{5}_i$ from the corresponding corrected strain variations $\Delta\sigma(\mathbf{6}_{ij})$ of a first optical fibre $\mathbf{5}_i$.

In other words, the processing means 11 correct each strain variation $\Delta\sigma(\mathbf{6}_{ij})$ or strain $\sigma(\mathbf{6}_{ij})$ determined into a first optical fibre $\mathbf{5}_i$ in the vicinity of a crossing point $\mathbf{21}_{ki}$ according to the temperature variation $\Delta T(\mathbf{8}_{kn})$ determined into at least a second optical fibre $\mathbf{7}_k$ in the vicinity of this crossing point $\mathbf{21}_{ki}$.

The determination of a temperature variation $\Delta T(\mathbf{8}_{kn})$ experienced by a second Bragg grating ($\mathbf{8}_{kn}$) can be performed by using an equation giving the temperature $T(\mathbf{8}_{kn})$ in a second Bragg grating $\mathbf{8}_{kn}$ as a function of a temperature reference $T_{ref}$ considered when there is no deformation, the Bragg wavelength $\lambda_B(\mathbf{8}_{kn})$ in this second Bragg grating $\mathbf{8}_{kn}$ considered when there is no deformation and when the temperature is equal to the reference temperature $T_{ref}$, and the determined wavelength $\lambda_R(\mathbf{8}_{kn})$ of the photons reflected by this second Bragg grating $\mathbf{8}_{kn}$. For instance, $T_{ref}=22.5°$ C., and n=1 to 3 when each second optical fibre $\mathbf{7}_k$ comprises three second Bragg grating $\mathbf{8}_{kn}$.

For instance the equation A may be:

$$\Delta T(\mathbf{8}_{kn}) = T_{ref} - \left(\frac{S_1}{2S_2}\right) + \sqrt{\left(\frac{S_1}{2S_2}\right)^2 + \frac{1}{S_2}\ln\frac{\lambda_R(\mathbf{8}_{kn})}{\lambda_B(\mathbf{8}_{kn})}}$$

where $S_1$ and $S_2$ are constants relative to the second optical fibre $\mathbf{7}_k$.

Such an equation can be used when the considered second optical fibre $\mathbf{7}_k$ is not strained as it will be detailed below in reference to FIGS. 3 and 4.

The temperature variation $\Delta T(\mathbf{8}_{kn})$ may also be calculated by considering that this temperature variation $\Delta T(\mathbf{8}_{kn})$ is proportional to a wavelength variation. We then first determine a difference between each determined wavelength of photons $\lambda_R(\mathbf{8}_{kn})$ reflected by a Bragg grating $\mathbf{8}_{kn}$ and corresponding Bragg wavelength $\lambda_B(\mathbf{8}_{kn})$, and then applying the proportional factor to calculate the temperature variation $\Delta T(\mathbf{8}_{kn})$ in the second Bragg grating $\mathbf{8}_{kn}$.

In a first manner, the determination of a corrected strain variation $\Delta\sigma(\mathbf{6}_{ij})$ experienced by a first Bragg grating $\mathbf{6}_{ij}$ is performed by using an equation giving the corrected strain $\sigma(\mathbf{6}_{ij})$ in a first Bragg grating $\mathbf{6}_{ij}$ and according to a strain reference $\sigma_{ref}(\mathbf{6}_{ij})$ in this first Bragg grating $\mathbf{6}_{ij}$ considered when there is no deformation along D1 and when the temperature is equal to a reference temperature $T_{ref}$, for instance 22.5° C.).

For instance, this equation B may be:

$$\sigma(\mathbf{6}_{ij}) = \frac{1}{k} * \left[\ln\frac{\lambda_R(\mathbf{6}_{ij})}{\lambda_B(\mathbf{6}_{ij})} - S_1 * \Delta T(\mathbf{8}_{kn}) - S_2 * (\Delta T_{ref}^2 - \Delta T_{0,ref}^2)\right] - (\alpha_s - \alpha_f) * \Delta T(\mathbf{8}_{kn})$$

where $\lambda_R(\mathbf{6}_{ij})$ is the determined wavelength in the corresponding first Bragg grating $\mathbf{6}_{ij}$, where $\lambda_B(\mathbf{6}_{ij})$ is the Bragg wavelength in the corresponding first Bragg grating $\mathbf{6}_{ij}$, where $\alpha_s$ is the coefficient of thermal expansion of the cooling plate 1, $\alpha_f$ is the coefficient of thermal expansion of the first optical fibre $\mathbf{5}_i$ comprising the first Bragg grating $\mathbf{6}_j$ (for instance equal to 0.5µε/° C.), k, $S_1$ and $S_2$ are strain gauge parameters determined in calibration sheets, $$\Delta T_{ref} = T(\mathbf{8}_{kn}) - T_{ref},$$

and $\Delta T_{0,ref} = T_0 - T_{ref}$ (with $T_0$ the temperature at the beginning of the measurement and $T_{ref}=22.5°$ C., for instance).

Figure 6:
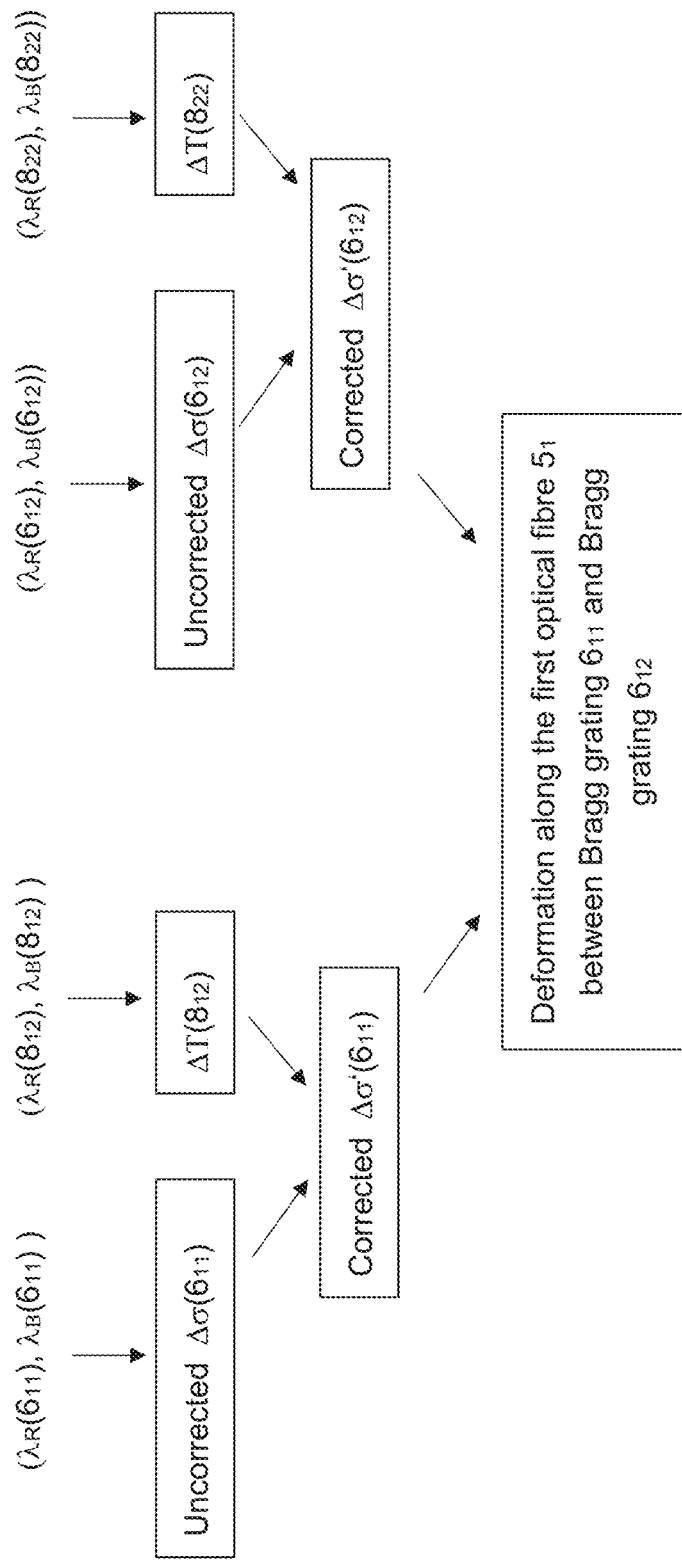
FIG. 6 illustrates schematically the process steps to determine deformation of the equipment according to one embodiment of the invention

In a second manner and as illustrated at FIG. 6, the determination of the deformation along for instance the first optical fibre $\mathbf{5}_1$ between a first first Bragg grating $\mathbf{6}_{11}$ and a second first Bragg grating $\mathbf{6}_{12}$ is performed by:

determining the uncorrected strain variations $\Delta\sigma(\mathbf{6}_{11})$ and $\Delta\sigma(\mathbf{6}_{12})$ from the corresponding couples $(\lambda_R(\mathbf{6}_{11}), \lambda_B(\mathbf{6}_{11}))$, $(\lambda_R(\mathbf{6}_{12}), \lambda_B(\mathbf{6}_{12}))$ using the above equation B when $T_0$ is equal to $T_{ref}$ and when $\Delta T(\mathbf{8}_{kn})$ is equal to 0 (no temperature variation), determining the temperature variations $\Delta T(\mathbf{8}_{12})$ and $\Delta T(\mathbf{8}_{22})$ from the corresponding couples $(\lambda_R(\mathbf{8}_{12}), \lambda_B(\mathbf{8}_{12}))$, $(\lambda_R(\mathbf{8}_{22}), \lambda_B(\mathbf{8}_{22}))$ of a first second Bragg grating $\mathbf{8}_{12}$ and of a second second Bragg grating $\mathbf{8}_{22}$ (see FIG. 1) using the above equation A when there is no deformation applied to the second optical fibers $\mathbf{7}_1$, $\mathbf{7}_2$ at least in the vicinity of the corresponding crossing points $\mathbf{21}_{11}$ and $\mathbf{21}_{21}$, correcting the previously determined strain variations $\Delta\sigma(\mathbf{6}_{11})$ and $\Delta\sigma(\mathbf{6}_{12})$ with the previously determined temperature variations $\Delta T(\mathbf{8}_{12})$ and $\Delta T(\mathbf{8}_{21})$, and evaluating the deformation along the first optical fibre $\mathbf{5}_1$ between the first first Bragg grating $\mathbf{6}_{11}$ and the second first Bragg grating $\mathbf{6}_{12}$.

The same determination method is applied for the other Bragg grating $\mathbf{6}_{1j}$ of the first optical fibre $\mathbf{5}_1$ and for the Bragg gratings $\mathbf{6}_{2j}$ of the second optical fibre $\mathbf{5}_2$ in order to evaluate the general deformation of the outer face 4 of the cooling plate 1.

In the case where a first optical fibre $\mathbf{5}_i$ comprises several first Bragg gratings $\mathbf{6}_{ij}$ near a crossing point $\mathbf{21}_{ki}$, the strain variation $\Delta\sigma(\mathbf{6}_{ij})$ of each of these first Bragg gratings $\mathbf{6}_{ij}$ may be determined by means of the determined temperature variation $\Delta T(\mathbf{8}_{kn})$ of the second Bragg grating $\mathbf{8}_{kn}$ that is the nearest of this crossing point $\mathbf{21}_{ki}$. In a variant, in the case where a first optical fibre $\mathbf{5}_i$ comprises several first Bragg gratings $\mathbf{6}_{ij}$ located between two crossing points $\mathbf{21}_{ki}$ and $\mathbf{21}_{k'i}$, and where there exists a temperature gradient between these two crossing points $\mathbf{21}_{ki}$ and $\mathbf{21}_{k'i}$, the strain variation $\Delta\sigma(\mathbf{6}_{ij})$ of each first Bragg grating $\mathbf{6}_{ij}$ (located between these two crossing points $\mathbf{21}_{ki}$ and $\mathbf{21}_{k'i}$) may be determined by means of an estimated temperature variation $\Delta T_E(\mathbf{8}_{kn})$ depending on the corresponding value of the temperature gradient at the location of this first Bragg grating $\mathbf{6}_{ij}$.

Figure 3:
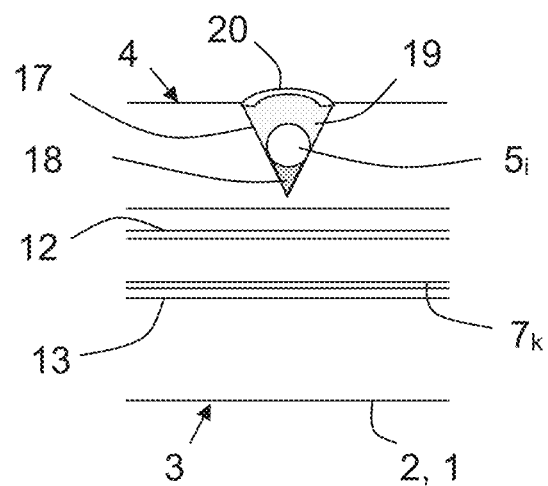
FIG. 3 illustrates schematically, in a first cross section view, a part of the cooling plate illustrated in FIG. 1 in the area of a crossing point.
Figure 4:
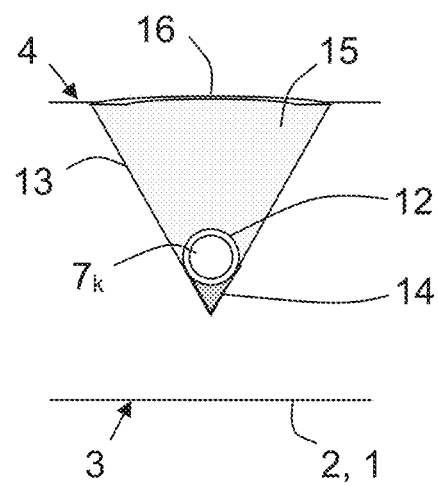
FIG. 4 illustrates schematically, in a second cross section view (in a plane perpendicular to the plane of the first cross section view), a part of the cooling plate illustrated in FIG.

Referring to FIGS. 3 and 4, in order to avoid any strain on the second optical fibers $\mathbf{7}_k$ and to perform the determination of the temperature variation $\Delta T(\mathbf{8}_{kn})$, this second optical fibre $\mathbf{7}_k$ is arranged in a thermal-conducting tube 12 that is set along one of the second directions D2 and whose diameter is substantially greater than that of the fibre $\mathbf{7}_k$. For instance, each thermal-conducting tube 12 may be made of inox.

Each thermal-conducting tube 12 may be installed fixedly in a horizontal groove 13 that is defined into the outer face 4 of the body 2 along one of the second directions D2. In this case, each thermal-conducting tube 12 may be installed fixedly in a horizontal groove 13 by means of a glue 14, for instance. This glue 14 may be the one produced by Vishay under reference M-bond 600 (and usable up to +260° C.), for instance.

The depth of each horizontal groove 13 depends on the diameter of the thermal-conducting tube 12 and on its shape. In the non-limiting example illustrated in FIG. 4, each horizontal groove 13 has a V-shape in cross section. But, it may have other shapes in cross section, such as a U-shape or a rectangular-shape. For instance, when the second optical fibre $7_k$ has a diameter comprised between 240 μm and 250 μm, the diameter of the thermal-conducting tube 12 may be equal to 1 mm and the depth of the horizontal groove 13 may be equal to 1.2 mm so that the second optical fibre $7_k$ is not strained Also for instance, and as illustrated in FIG. 4, each thermal-conducting tube 12 may comprise an exterior-facing part covered with a copper paste 15. The latter 15 is intended for avoiding the presence of a layer of air against the exterior-facing part of the thermal-conducting tube 12, because of bad thermal conductivity of air. It could be also possible to use a stainless-steel material.

Also for instance, and as illustrated in FIG. 4, each copper paste may comprise an exterior-facing part covered with a copper cover 16. The latter (16) is intended for protecting the thermal-conducting tube 12 against shocks.

As illustrated in FIG. 3, each first optical fibre $5_i$ may be installed fixedly in a vertical groove 17 defined into the outer face 4 of the body 2 along a first direction D1. In each crossing point $21_{ki}$, the first optical fibre $5_i$ is preferably nearer from the exterior than the second optical fibre $7_k$. Therefore, when the latter ($7_k$) are located inside thermal-conducting tubes 12, the latter (12) may comprise deformations in each corresponding crossing point $21_{ki}$ in order to pass "below" the vertical grooves 17, or else the horizontal grooves 13 must have a much more important depth so that the second optical fibers $7_k$ be everywhere "under" the level of the vertical grooves 17 (for instance this depth may be equal to 1.2 cm or 2 cm). In these cases, the thermal-conducting tubes 12 must be installed fixedly inside the horizontal grooves 13 before the first optical fibre(s) $5_i$ is/are installed fixedly in vertical groove(s) 17. In a variant of embodiment, instead of defining horizontal grooves 13 into the outer face 4, it is possible to define drills into the body 2, "under" the level of the vertical grooves 17, and then to introduce the thermal-conducting tubes 12 inside these body drills.

The depth of each vertical groove 17 depends on the diameter of the first optical fibre $5_i$. In the non-limiting example illustrated in FIG. 3, each vertical groove 17 has a V-shape in cross section. But, it may have other shapes in cross section, such as a U-shape or a rectangular-shape. For instance, when the first optical fibre $5_i$ has a diameter comprised between 240 μm and 250 μm, the depth of the vertical groove 17 may be equal to 1 cm.

For instance, and as illustrated in FIG. 3, each first optical fibre $5_i$ may be installed fixedly in a vertical groove 17 by means of a glue 18. This glue 18 may be the one produced by Vishay under reference M-bond 600 (and usable up to +260° C.), for instance.

Also for instance, and as illustrated in FIG. 3, each first optical fibre $5_i$ may comprise an exterior-facing part covered with a seal material 19 intended for protecting against mechanical shocks. This seal material 19 may be a silicon rubber produced by Vishay under reference RTV3145 (and usable up to +260° C.), for instance. It is also possible to insert a varnish between each first optical fibre $5_i$ and the seal material 19, for protecting each first optical fibre $5_i$ and the glue 18. For instance, this varnish may be the one produced by Vishay under reference M-COAT A.

Also for instance, and as illustrated in FIG. 4, the seal material 19 may comprise an exterior-facing part covered with a protection material 20 intended for protecting it against heat shocks. For instance, this protection material 20 may be a silicone.

The processing means 11 may be localized into a computer, away from the cooling plate 1, for instance. In this case, it is preferably made of software modules, at least partly. But it could be also made of a combination of electronic circuit(s) (or hardware modules) and software modules (which also requires a software interface allowing interworking between the hardware and software modules). So, it could be a computer. In case where it is made only of software modules it can be stored in a memory of a computer or in any computer software product, such as a CD-ROM, for instance, which can be read by a computer or the like.

Thanks to the permanent determination of the wavelengths of photons reflected by the Bragg gratings defined into the optical fibers (dedicated to strain measurement and temperature measurement), it is now possible to monitor in real time the evolution of the vertical deformation of the cooling plates (or staves) of a blast furnace, and more generally of determining deformation in a given direction of any equipment in contact with hot material.

Optionally, the inner face 3 of the cooling plate 1 may also comprise one or more optical fibers (non illustrated) for the determination of temperature variations on this face 3 which are set along the first direction D1 in an arrangement corresponding to the optical fibers $5i$ of the cold face 4.

What is claimed is:

1. A method of determining deformation along a first direction of an equipment in contact with hot material and having an inner face in contact with the hot material and an outer face opposite to the inner face, the method comprising the steps of:
   providing the outer face with:
      at least one first optical fiber set along the first direction and including at least two first Bragg gratings having different grating periods for reflecting photons having different Bragg wavelengths, and
      at least two second optical fibers set along at least one second direction and each crossing the at least one first optical fiber at a crossing point located at a respective one of the at least two first Bragg gratings, and each second optical fiber including at the respective crossing point, a second Bragg grating having a grating period for reflecting photons having a Bragg wavelength,
   inputting photons having wavelengths belonging to a wavelength group including all of the Bragg wavelengths, into respective first ends of the first and second optical fibers,
   determining wavelengths of photons reflected by a corresponding first or second Bragg grating, and
   determining a deformation of the equipment along the first direction from corresponding couples each including a determined wavelength and a corresponding Bragg wavelength.

2. The method according to claim 1 wherein the at least one first optical fiber includes two first optical fibres set along the first direction in parallel and the at least two first Bragg gratings including at least three first Bragg gratings having different grating periods for reflecting photons having different Bragg wavelengths, and the at least two optical second fibers include three second optical fibres set along the at least one second direction each crossing the two first optical fibres at crossing points located at three of the first Bragg gratings and each including at least two second Bragg gratings having different grating periods for reflecting photons having different Bragg wavelengths and located at corresponding crossing points.

3. The method according to claim 1 wherein the step of determining the deformation includes the sub steps of:

determining a strain variation experienced by each first Bragg grating considering there is no temperature variation from the corresponding couple including determined wavelength of photons reflected by the respective first Bragg grating and the Bragg wavelength of the respective first Bragg grating, and from a strain reference, determining a temperature variation into each second Bragg grating from the corresponding couple including the determined wavelength of photons reflected by the respective second Bragg grating and the Bragg wavelength of the respective second Bragg grating, correcting the determined strain variation of each first Bragg grating according to the determined temperature variation of at least the second Bragg grating located at at least the first Bragg grating, and determining the deformation of the equipment along the first direction from the corresponding corrected strain variations of the at least first optical fiber.

4. The method according to claim 1 wherein the step of determining the deformation includes the sub steps of:

determining a temperature variation into each second Bragg grating from the corresponding couple including the determined wavelength of photons reflected by the respective second Bragg grating and the Bragg wavelength of the respective second Bragg grating, determining a corrected strain into each first Bragg grating using the previously determined temperature variation, determining a corrected strain variation experienced by each first Bragg grating from the previously determined corrected strain and from a strain reference, and determining the deformation of the equipment along the first direction from the corresponding corrected strain variations of the at least first optical fiber.

5. Equipment intended for being in contact with hot material and comprising:

an inner face in contact with the hot material; and an outer face opposite to the inner face, the outer face including:

i) at least one first optical fiber set along a first direction and including at least two first Bragg gratings having different grating periods for reflecting photons having different Bragg wavelengths, ii) at least two second optical fibers set along at least one second direction each crossing the at least one first optical fiber at a crossing point located at one of the first Bragg gratings and each including, at a crossing point, a second Bragg grating having a grating period for reflecting photons having a Bragg wavelength, iii) photon sources arranged for inputting photons, having wavelengths belonging to a wavelength group including all of the Bragg wavelengths, into respective first ends of the first and second optical fibers, iv) sensors coupled respectively to the first ends and arranged for determining wavelengths of photons reflected by a corresponding first or second Bragg grating, and v) a processor arranged for determining a deformation of the equipment along the first direction from corresponding couples each including a determined wavelength and a corresponding Bragg wavelength.

6. The equipment according to claim 5 wherein the at least one first optical fiber includes two first optical fibers set along the first direction in parallel and the at least two first Bragg gratings including at least three first Bragg gratings having different grating periods for reflecting photons having different Bragg wavelengths, and the at least two second optical fibers including three second optical fibres set along the at least one second direction each crossing the two first optical fibres at crossing points located at three of the first Bragg gratings, and each including at least two second Bragg gratings having different grating periods for reflecting photons having different Bragg wavelengths and located at corresponding crossing points.

7. The equipment according to claim 5 wherein the processor is arranged for determining a strain variation experienced by each first Bragg grating from the corresponding couple including the determined wavelength of photons reflected by the respective first Bragg grating and the Bragg wavelength of the respective first Bragg gratin, and a temperature variation into each second Bragg grating from the corresponding couple including the determined wavelength of photons reflected by the respective second Bragg grating and the Bragg wavelength of the respective second Bragg grating, then for correcting the determined strain variation of each first Bragg grating according to the determined temperature variation of at least the second Bragg grating located at at least the first Bragg grating, then for determining the deformation of the equipment along the first direction of a respective first optical fiber from the corresponding corrected strain variations of the respective first optical fiber.

8. The equipment according to claim 5 wherein each second optical fiber is installed in a thermal-conducting tube set along the at least one second direction.

9. The equipment according to claim 8 wherein each thermal-conducting tube is installed fixedly in a horizontal groove defined into the outer face along the at least one second direction.

10. The equipment according to claim 9 wherein each thermal-conducting tube is installed fixedly in a horizontal groove via glue.

11. The equipment according to claim 9 wherein each thermal-conducting tube includes an exterior-facing part covered with a copper paste.

12. The equipment according to claim 11 wherein the copper paste includes an exterior-facing part covered with a copper cover.

13. The equipment according to claim 5 wherein each first optical fiber is installed fixedly in a vertical groove defined into the outer face along the first direction.

14. The equipment according to claim 13 wherein each first optical fiber is installed fixedly in a respective vertical groove by glue.

15. The equipment according to claim 13 wherein each first optical fiber includes an exterior-facing part covered with a seal material.

16. The equipment according to claim 15 wherein the seal material includes an exterior-facing part covered with a protection material intended for protection against heat shocks.

17. The equipment according to claim 5 wherein the equipment defines a cooling plate of a blast furnace.

18. The equipment according to claim 17 wherein the first direction is a vertical direction of the cooling plate and the at least one second direction includes an horizontal direction of the cooling plate.

19. The equipment according to claim 5 wherein all of the at least one second direction are parallel.

20. A blast furnace comprising the equipment according to claim 5.

* * * * *